Aug. 12, 1969  J. LIPP  3,460,883
TOTAL INTERNAL REFLECTION DEFLECTOR
Filed Oct. 1, 1965
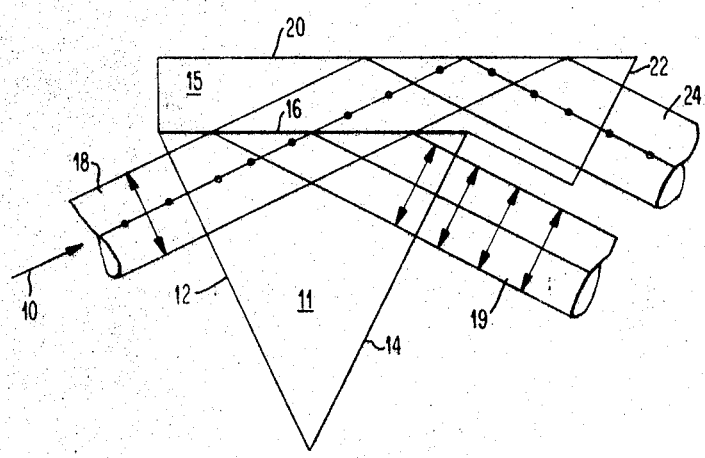
INVENTOR
JAMES LIPP
BY *Earl C. Hancock*
ATTORNEY

United States Patent Office 3,460,883
Patented Aug. 12, 1969

3,460,883
TOTAL INTERNAL REFLECTION DEFLECTOR
James Lipp, Kingston, N.Y., assignor to International Business Machines Corporation, Armonk, N.Y., a corporation of New York
Filed Oct. 1, 1965, Ser. No. 491,995
Int. Cl. G02f *1/24*
U.S. Cl. 350—157    3 Claims

ABSTRACT OF THE DISCLOSURE

Described is an optical device for separating beams of light containing two different orthogonal polarizations into separate beams, each having one of the two different polarizations of light. The beams are separated by an optical device using birefringent materials with a thin isotropic material between the birefringent elements.

---

This invention relates to optical devices for selecting or separating light rays or beams on the basis of polarization thereof. More particularly, this invention relates to devices for segregating the light generated from a common source where the light is either of a first polarization or of a polarization orthogonal with respect thereto. The present invention is particularly useful for binary separation or deflection of light under electronic control. This invention is an improvement to the invention disclosed in application Ser. No. 491,997 filed concurrently herewith and entitled, "Total Internal Reflection Deflector," by G. O. Boehm, H. S. Hoffman, Jr., and J. H. Williams, said application being assigned to the same assignee as the present application.

The aforementioned Boehm et al. application discloses a configuration for electro-optical separation of light based upon the polarization orientation thereof. The present invention is a closely related electro-optic crystal configuration which includes self-correction of the light paths for different wavelengths of radiation which may be made to propagate through the system. Both the present invention and the Boehm et al. invention advantageously utilize an initial prism and a redirection plate arranged for polarized light separation by total internal reflection. In the present invention, however, the initial prism and the redirection plate are both constructed from birefringent material having correlating indices at refraction with a thin isotropic layer separating these two devices. By utilizing the construction in accordance with the present invention, not only is the advantage of path length compensation described in the Boehm et al. application realized, but in addition, the light separator is rendered relatively insensitive with respect to wavelength variations and is self-corrected for light path length over a relatively broad range of wavelengths. The isotropic medium separating the plate and prism could be as thin as one wavelength of light.

Accordingly, it is an object of the present invention to provide an improved light separator having internal wavelength correction.

It is another object of this invention to provide a means for separating polarized light generated from a common source.

Still another object of the present invention is to utilize advantageously the characteristics of both birefringent and isotropic material to accomplish polarized light separation.

It is yet another object of the present invention to provide segregation of polarized light based upon the orientation of that polarization.

A still further object of the present invention is to permit electronic light beam switching.

The foregoing and other objects and features of the present invention will be apparent from the following more particular description of a preferred embodiment of this invention as is illustrated in the accompanying drawing.

In the drawing, a light source 10 produces polarized light which is either oriented perpendicular to the plane of the drawing as is represented by dots or is oriented in the plane of the drawing as is represented by double-headed arrows. This source 10 is oriented to direct an input beam 19 normal to surface 12 of birefrigent prism 11. After entering prism 11, the portion of the light which is sensitive to a relatively high index of refraction impinges upon interface 16 at an angle greater than critical so that this portion of the light is redirected towards output surface 14 as output beam 19. At the same time, the portion of the light which is passed by interface 16 is permitted to do so since it impinges upon interface 16 at an angle less than critical for the associated index of refraction.

The present invention differs from that shown in Boehm et al. in application Ser. No. 491,997 in that plate 15 is preferably constructed of substantially the same birefringent material as prism 11. The optic axis of prism 11 is perpendicular to the plane of the drawing and parallel to the apices of prism 11 with the optic axis of plate 15 being parallel to the optic axis of prism 11. Interface 16 is made up of a layer of isotropic material which has an index of refraction substantially matching the lower index of refraction for 11 and 15. The interface 16 could have a thickness as small as one wavelength of light. Means is included to surround surface 20 with a material which will cause the light passing through interface 16 to be totally reflected at surface 20 onto output surface 22 thereby forming output beam 24. This means could be a coating for specular reflection or could be a material of index of refraction lower than the lowest such index for plate 15.

It is apparent the boundary or interface 16 can be fluid filled which could provide optimum coupling but any paste, deposit, slab or cement type configuration could be satisfactory as long as it provides the aforementioned index matching function. By matching the birefringent materials for prism 11 and block 15, the indices of the mediums are equal for any given wavelength and/or temperature. Therefore, no refraction will occur for light when passing from the prism 11 into plate 15 except for the small amount from the exceedingly thin layer of isotropic material which is corrected upon entry of the beam into plate 15. For practical purposes, no deviation occurs.

As is discussed in the aforementioned Boehm et al. application, the light entering plate 15 would preferably be arranged to experience the lower index of refraction while the light reflected at interface 16 will experience the higher index. If this relation is observed, the device will be self-compensated for length of optic light paths.

While the invention has been particularly shown and described with reference to a preferred embodiment thereof, it will be understood by those skilled in the art that changes in form and detail may be made therein without departing from the spirit and scope of the invention. For instance, this invention is bi-directional as was Boehm et al.

What is claimed is:
1. An improved polarized light deflector comprising:
   a source for selectably producing polarized light,
   a prism of birefringent material having at least two apices and an optic axis parallel to each of said apices for accepting the light from said source through a first surface thereof defined by a plane containing one of said apices, said light passing through said first surface at an angle substantially normal to said first surface, isotropic means arranged contiguous to a second surface of said prism and having an index of refraction substantially the same as the lower index of refraction of said prism, the light from said source passing through said second surface when of one polarization and being totally reflected from said second surface through a third surface of said prism when of a second polarization orthogonal with respect to said first polarization, a plate of birefringent material having an optic axis parallel to the optic axis of said prism arranged contiguous to said isotropic means for accepting the polarized light passing therethrough, and means associated with said plate for redirecting the light passing through said plate into a path in the same direction and parallel to the light passing through said third surface.

2. Apparatus in accordance with claim 1 wherein said isotropic means is a liquid having an index of refraction substantially matching the lower index of refraction of said birefringent material.

3. Apparatus in accordance with claim 1 wherein said isotropic means and said plate form an optical path length passing through said isotropic means and said plate which is substantially the same as the optical path length followed by light reflected at said second surface.

References Cited

UNITED STATES PATENTS

| 2,447,828 | 8/1948 | West | 350—157 |
| 2,449,287 | 9/1948 | Flood | 350—152 |
| 2,601,175 | 6/1952 | Smith | 350—157 |

FOREIGN PATENTS 918,102  1/1947  France.

OTHER REFERENCES

Fleisher et al.: Digital Indexed Angular Light Deflector System, IBM Technical Disclosure Bulletin, vol. 6, No. 5, October 1963, pp. 32–34.

DAVID SCHONBERG, Primary Examiner

P. R. GILLIAM, Assistant Examiner